Aug. 30, 1955  W. R. DRAY  2,716,481
DRAPER AND HEADER COMBINATION
Filed Jan. 19, 1954  2 Sheets-Sheet 1

INVENTOR
WALTER R. DRAY
BY
ATTORNEY

Aug. 30, 1955 W. R. DRAY 2,716,481
DRAPER AND HEADER COMBINATION
Filed Jan. 19, 1954 2 Sheets-Sheet 2
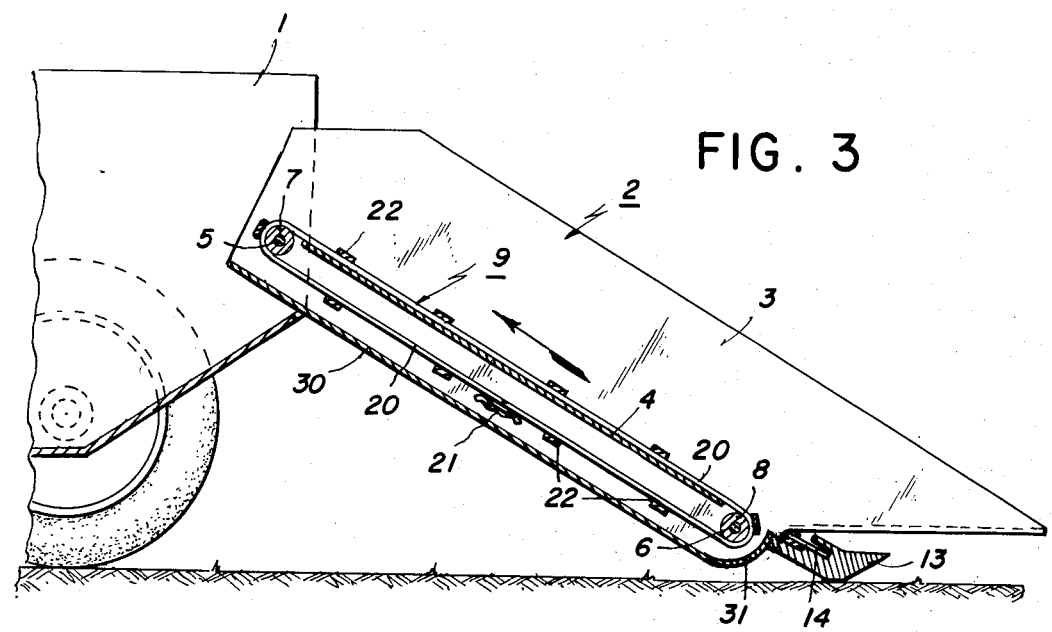
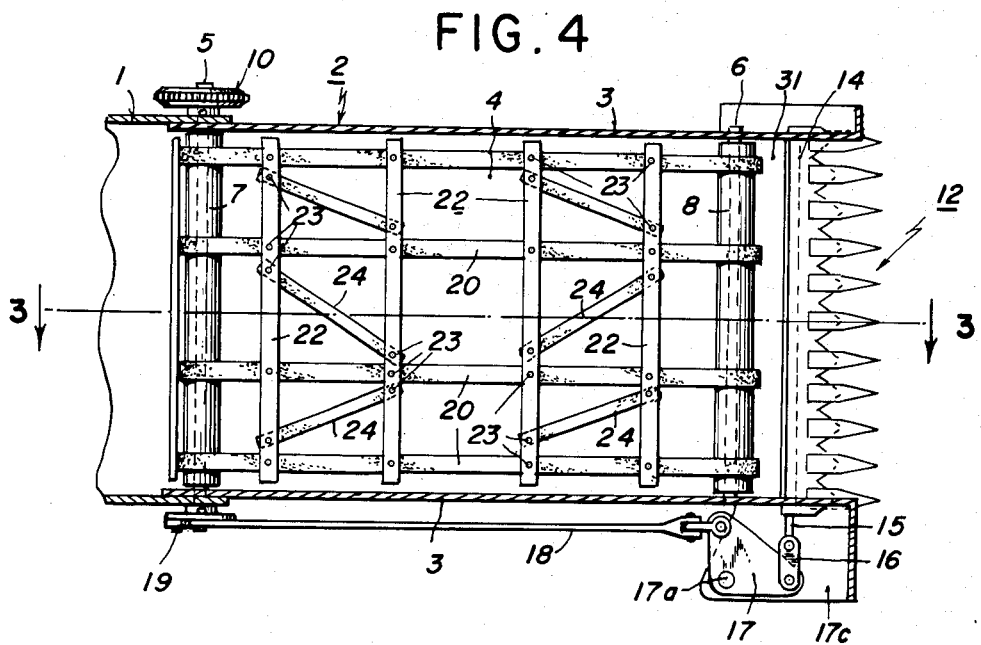
INVENTOR
WALTER R. DRAY
BY Albert H. Kirchner
ATTORNEY

United States Patent Office 2,716,481
Patented Aug. 30, 1955

2,716,481

DRAPER AND HEADER COMBINATION

Walter R. Dray, Yorkville, Ill.

Application January 19, 1954, Serial No. 404,854

13 Claims. (Cl. 198—195)

The present invention relates to drapers and to draper and header combinations and this application is a continuation-in-part of my copending patent application Serial No. 24,172, filed April 30, 1948, now Patent No. 2,667,728, issued February 2, 1954.

The principal object of the invention which is the subject of this present application is to provide improvements in the draper element and in the associated header structure in agricultural machinery such as harvesters, harvester-thresher combines and the like in which stalks of grain and other growing field crops are cut from their standing position and conveyed up into a vehicle for transportation and/or further processing, such as threshing.

Particular objects are concerned with enhancing the durability of the draper, increasing its efficiency, reducing slippage relative to the driving roller and the consequent necessity for making adjustments of tension, and reducing manufacturing and maintenance costs.

Related objects include improving the header construction to eliminate dropping and loss of stalks, prevent undue wear of the draper, promote general efficiency, and reduce manufacturing and maintenance costs.

These and other objects and advantages of the new construction will be apparent to those skilled in the art from the following explanation of the preferred embodiment of the invention disclosed in the accompanying drawings in which:

Fig. 3 is a longitudinal sectional view taken on the line 3—3 of Fig. 4; and

Fig. 4 is a top plan view of the draper and adjacent structure taken on the section line 4—4 of Fig. 1.

Figure 1:
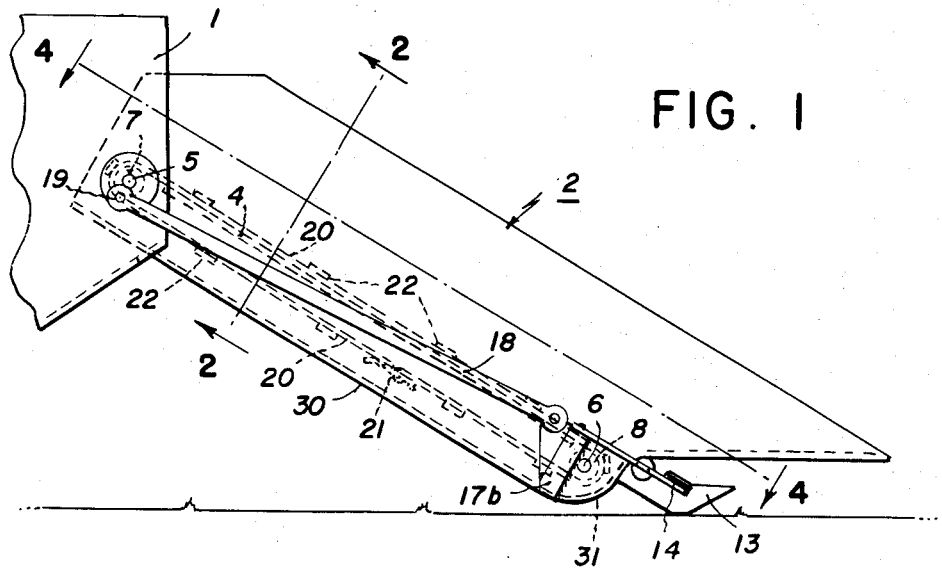
Figure 1 is a side elevational view of the draper and header combination.

Referring to the drawings, the reference numeral 1 designates the forward end portion of a vehicle, such as a harvester, harvester combine or the like, to which is attached a header 2 in forwardly projecting declined position. As is usual in machinery of this character, the header is pivoted at its rear end to the forward end of the vehicle and is supported for swinging movement down into operative position and up into inoperative position by links, rods or the like (not shown). In the present construction the header has a pair of parallel side walls 3, 3, made of metal plates and connected considerably above their lower edges by an apron 4 in the form of a metal plate extending somewhat less than the full length of the side walls to form therewith a rigid trough.

A rear shaft 5 and a forward shaft 6 are journaled in the side walls 3 near the opposite ends of the header, beyond the ends of the apron 4, and are provided with rollers 7, 8, respectively, appropriately surfaced for making good friction contact with a draper 9 which is trained over the rollers and is to be driven by one of them.

The rear shaft 5 is journaled in bearings fixed on the vehicle side walls for pivoting the header to the vehicle.

The draper drive is best effected by the rear roller 7, and for this purpose one of the ends of the shaft 5 is projected considerably beyond its journal in the adjacent vehicle side wall bearing, and a sprocket 10 is made fast on the protruding end of the shaft for driving by a chain from a suitable motor (not shown) on the vehicle, or by connection (not shown) to the vehicle ground wheels. The shaft 6 is idle, rotating freely as the draper 9 moves around it.

A sickle, generally designated 12, is provided at the front of the header and comprises a guard member 13 fixed across the front of the header and a blade 14 mounted for transverse reciprocation in shearing relation with the guard. The sickle may be driven by a rod 15 projecting from one end, preferably the end opposite the side wall 3 adjacent which the sprocket 10 is mounted, and this rod is connected by a push-pull link 16 to a bellcrank 17 pivoted at 17a to a post 17b upstanding from a bracket 17c projecting from the adjacent side wall 3 of the header and oscillated by a pitman 18 driven from an eccentric or crank pin 19 on the end of the shaft 5 opposite the sprocket 10 which projects from the vehicle side wall, all as shown in my co-pending application.

Figure 2:
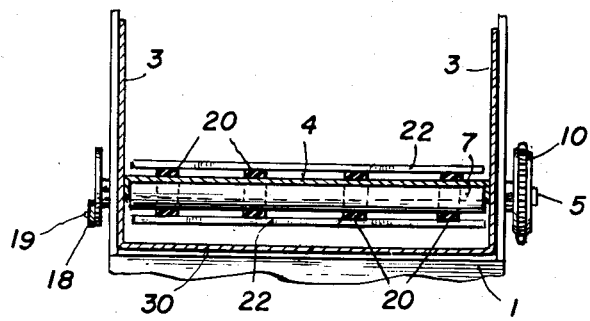
Fig. 2 is a cross sectional view taken on the line 2—2 of Fig. 1.

The novel draper 9 provided by the present invention comprises a skeletonized endless conveyor made up of a plurality of belts 20 which are trained over the rollers 7, 8 in laterally spaced relation, as best shown by Fig. 2. Each of these belts may be made of rubberized heavy canvas or the like, preferably bias cut material, having a fair degree of lengthwise stretch or elasticity. Unlike the conventional uncoated canvas generally used as "wide belt" drapers, the material preferred for the new skeletonized belt assembly makes good frictional contact with smooth surfaced metal rollers, so that in the new structure the rollers 7, 8 need not be provided with rubberized lagging. The ends of each belt are connected by a buckle or other suitable belt fastener 21 capable of being adjusted from time to time to take up looseness in the belt and cooperating with the stretchability of the material to insure a suitable degree of tightness over long periods of use.

The belts of the assembly are connected by a plurality of longitudinally spaced transverse slats 22, which may be strips of hard wood, to which the belts are riveted or otherwise affixed by fasteners 23.

It is important that the belts be maintained in accurate lengthwise alignment and that the slats be constrained against both lateral shifting and skewing, so that the draper will run in an accurately longitudinal direction and not shift sidewise and so that neither side will run faster than the other, i. e., so that the belts will all run at the same rate. Any differential in speed of belt travel would, it will be appreciated, result in skewing of the slats, i. e., in the slats becoming displaced so as not to be positioned accurately parallel to the roller axes.

Lateral shifting of the slats is prevented, and accurate longitudinal alignment of the belts is insured, by extending the ends of the slats slightly beyond the outermost belts. Contact of these projecting ends of the slats with the header side walls 3, 3 thus keeps the belts running in proper longitudinal parallelism. But additional means is needed to prevent skewing of the slats, which, as has been explained, is a condition resulting from any belt running faster than the others, which would result in one or more of the slats deviating from accurate parallelism with the roller axes and hence not being positioned accurately normal to the direction of belt travel.

For this purpose the draper includes braces 24 connecting the slats. These braces are made of the same material as the belts and, as shown, they are disposed diagonally, or at oblique angles between the adjacent slats of alternate pairs. Because the braces are made of flexible material, they can act only in tension, and not in compression. This requires opposite slanting of at least some of the braces that connect the same pair of slats. With this arrangement skewing of a slat in one direction will be resisted by at least one of the braces acting in tension, and skewing in the opposite direction will be resisted by at least one other brace acting in tension. In the arrangement shown, the braces of the entire assembly are disposed at equal and opposite angles to the slats. Thus, when the draper comprises four belts 20, with consequently three spaces between the belts, three braces are connected between each alternate pair of slats, one brace in each of the spaces, and two of these braces are disposed in general parallelism, at substantially the same angle, and the third brace is disposed at an opposite but substantially equal angle. In order to equalize the aggregate pulling stress of all the braces on all the slats, the arrangement shown in Fig. 4 is adopted. This involves disposing the braces of longitudinally adjacent sets in symmetrical relationship, i. e., the non-parallel brace of one set is offset by two parallel braces of the next succeeding set. In this way all the stresses are equalized, with substantially equal force opposing skewing in either direction, and the draper is caused to run with all the slats accurately perpendicular to the line of belt travel.

The upper run of the draper engages the upper surface of the apron 4, so that there is little or no tendency for stalks cut by the sickle to wedge between the belts or slats and the apron. The slats can be made relatively high or thick, since their weight in the upper run is supported by the apron and their weight in the lower run will have the desirable result of increasing the frictional contact with the rollers.

It sometimes happens that an occasional stalk will drop off the upper or delivery end of the draper and not be received in the vehicle 1. In order to keep such stalks from falling to the ground, I provide a bottom wall 30 connecting the two side walls 3 of the header and forming a closure, well spaced below the lower run of the draper. Stalks which fall through to this bottom wall slide downwardly along it until they reach the upwardly curved lower end 31 of the bottom wall, which is spaced closer to the draper than the wall itself. Here these stalks are caught by the advancing slats and are returned to the upper surface of the draper for delivery to the vehicle.

It is believed that the structure and advantages of the invention will be sufficiently evident to those skilled in the art from the foregoing illustration and description of the preferred form of embodiment. Various changes, modifications and omissions may be made in this embodiment without departing from the spirit of the invention as pointed out by the broader of the appended claims.

I claim:

1. In a draper and header combination, a header having a pair of side walls and a connecting apron, rollers at opposite ends of said side walls in the plane of said apron, a conveyor comprising a plurality of endless belts extending in parallel spaced relation around said rollers, transversely extending slats secured to said belts, and a plurality of short straps each extending only between the slats of adjacent pairs and secured thereto for preventing skewing of the slats of said conveyor.

2. A canvasless draper comprising a plurality of endless narrow spaced parallel belts, slats extending transversely of said belts exteriorly thereof and secured thereto, and means for keeping said slats square to the line of travel thereof comprising short flexible braces having their ends connected to adjacent slats.

3. In a draper and header combination, a header comprising a pair of side walls connected by an apron to provide a rigid trough-like assembly, rollers mounted transversely of said assembly at the opposite end portions thereof and in a plane adjacent to the plane of the apron, and a draper trained over said rollers and around said apron comprising a plurality of transversely spaced endless parallel belts having their inner surfaces engaged with said rollers, a plurality of longitudinally spaced transversely extending parallel slats secured to the outer surfaces of the belts, means rotating one of the rollers to drive the draper around the rollers, and means for keeping the slats from shifting laterally comprising short flexible braces having their ends connected to adjacent slats.

4. The combination claimed in claim 3, in which the braces are connected diagonally between adjacent slats.

5. The combination claimed in claim 3, in which the braces are connected diagonally between alternate adjacent pairs of slats.

6. The combination claimed in claim 3, in which the braces are connected diagonally between adjacent slats with each brace disposed at an angle oblique to the direction of travel of the belts and with substantially equal numbers of the braces making opposite and equal angles with said direction of travel.

7. The combination claimed in claim 1, in which the ends of the slats extend laterally beyond the sidemost belts for engagement with the side walls of the header to prevent undue lateral shifting of the conveyor.

8. The combination claimed in claim 1, in which the belts are made of relatively elastic material.

9. The combination claimed in claim 1, in which the belts are made of relatively elastic material having greater stretch in lengthwise direction than in lateral direction.

10. The combination claimed in claim 1, in which the belts are made of rubberized canvas.

11. The combination claimed in claim 1, in which the short straps are disposed at oblique angles to the slats.

12. The combination claimed in claim 1, in which a plurality of short straps are connected between the slats of an adjacent pair and are disposed at opposite oblique angles to the slats.

13. The combination claimed in claim 1, in which a plurality of straps are connected between the slats of alternate pairs, with the straps connecting the same pair disposed at opposite oblique angles to the slats.

References Cited in the file of this patent

UNITED STATES PATENTS

| | | |
|---|---|---|
| 808,024 | Dingee | Dec. 19, 1905 |
| 1,514,131 | Coburn | Nov. 4, 1924 |
| 1,723,357 | Koopman | Aug. 6, 1929 |
| 2,388,861 | McCann | Nov. 13, 1945 |